Sept. 29, 1970 S. EPSTEIN ET AL 3,530,952
UNDERSEA, LONG-RANGE TRACKING AND SIGNALLING
SYSTEMS AND APPARATUS
Filed May 23, 1968 4 Sheets-Sheet 1

INVENTORS
SIDNEY EPSTEIN
DAVID EPSTEIN

Sept. 29, 1970     S. EPSTEIN ET AL     3,530,952
UNDERSEA, LONG-RANGE TRACKING AND SIGNALLING
SYSTEMS AND APPARATUS
Filed May 23, 1968     4 Sheets-Sheet 2

INVENTORS
SIDNEY EPSTEIN
DAVID EPSTEIN
BY

INVENTORS
SIDNEY EPSTEIN
DAVID EPSTEIN
BY

United States Patent Office 3,530,952
Patented Sept. 29, 1970

3,530,952
UNDERSEA, LONG-RANGE TRACKING AND
SIGNALLING SYSTEMS AND APPARATUS
Sidney Epstein and David Epstein, Brooklyn, N.Y., assignors to Vadys Associates, Ltd., New York, N.Y., a corporation of New York
Filed May 23, 1968, Ser. No. 731,396
Int. Cl. G08b 3/14
U.S. Cl. 181—.5     12 Claims

ABSTRACT OF THE DISCLOSURE

A neutrally buoyant deep-drifting float assembly formed of a neutrally buoyant core having a plurality of neutrally buoyant signalling modules releasably mounted thereon and incorporating means to effect preprogrammed release and selective modification of the buoyancy characteristics thereof to induce displacement of a released signalling module into a communication channel.

---

This invention generally relates to the tracking of bodies on or in the ocean and in particular to the long-range, long-time tracking of so-called Swallow floats in the deep ocean areas.

H. Stommel suggested (Deep-Sea Res. 2 284–285 [1955]) the utilization of a neutrally buoyant float, selectively stabilizable at a predetermined depth for measuring deep-drift ocean currents over a long period of time. When so stabilized, tracking the movement thereof would give a direct measurement of the strength and direction of the current at the stabilization depth free from the uncertainties attendant conventional current meters which are usually suspended from an anchored ship, or the like, J. C. Swallow designed such a float ("A Neutral-Buoyancy Float for Measuring Deep Currents," Deep-Sea Res. 3 74–81 [1955]) and such type of float is now commonly referred to as the Swallow float. Such Swallow floats usually consist of a watertight, pressure-resistant, hollow, aluminum alloy tube which houses an electro-acoustic "pinger" and provides the excess buoyancy to float itself and payload at the desired operating depth. Units of such type are obtainable from Ocean Research Equipment Co. of Falmouth, Mass., and spherical floats are obtainable from the Benthos Co. of North Falmouth, Mass.

Because a body which is less compressible than sea water will gain buoyancy as it sinks, the Swallow float is designed to be neutrally buoyant at a specific depth so as to float with a deep drift ocean current. As pointed out by Swallow and L. V. Worthington, in ("An observation of a Deep Countercurrent in the Western North Atlantic," Deep-Sea Res. 8 1–19 [1961]) the means density of such a float is ordinarily adjusted to an accurately known value by immersing it in a salt solution of known density and temperature and adding weights until it is neutrally buoyant. Prior to launching thereof, temperature and salinity observations are made and the water density at the desired depth is calculated from tables. The extra weight required to take the float down to any desired depth can then be determined from the known density at that depth and the calculated compressibility of float and such is added prior to launching.

The Swallow and Worthington article also describes many prior art methods of tracking Swallow floats and the inaccuracies and difficulties attendant thereto. One of the major problems that is faced stems from the fact that the Swallow float electronic pingers are inherently short-range devices and require the presence of the tracking ship in the immediate vicinity of the deep drifting float. Because the speed of said float may be quite low, usually less than 1 knot (0.5 meter/second), the float may make little headway over short time intervals thereby requiring monitoring vessel to remain practically stationary during the observation period. Although longer observation periods may be desirable, such observation periods are usually limited because keeping a ship on station for days on end merely to track a slow moving Swallow float is, amongst other things, a tedious and costly enterprise.

This invention may be briefly described as an improved construction for a neutrally buoyant deep drifting float assembly comprising a neutrally buoyant core float having releasably mounted thereon a plurality of neutrally buoyant signalling modules incorporating means to effect a preprogrammed release thereof and a selective modification of its buoyancy characteristics to induce its displacement into a Sofar channel and subsequent detonation.

Thus in accord with the principles of this invention means are provided to eliminate the heretofore constraining relationship of tracking ship to drifting float. In broad aspect, an improved float may now be deployed from ship or from an aircraft and long-range sonic contact with the float is maintained via the deep underwater sound channel commonly referred to as the "Sofar" channel. As disclosed in Ewing, U.S. Pat. No. 2,587,301, a small explosive charge detonated in the Sofar channel may be reliably "heard" for hundreds of miles. Thus, for example, a monitoring ship will now be free to engage in other activities at distances remote from the float and by merely lowering a pair of hydrophones, separated in space and preferably optimally oriented into the sound channel just prior to the expected deonation time will be able to obtain the desired intelligence since the time duration of the received signal after passage through the Sofar channel is proportional to the range and the bearing may be determined by cross-correlating the hydrophone signals to ascertain the position of a float vis-a-vis the ship. Alternately, and even more accurately, float fixes may be obtained by pairs of "nearby" island or coastal earthquake observatories, searching inter alia for the so-called earthquarke-generated T phase signals in the deep sound channel and/or U.S. Navy Sofar stations by techniques disclosed in "Elastic Waves in Layered Media," Ewing et al., McGraw-Hill, New York, p. 341 (1957), and wherein at least two pairs of cross-correlated signals may then be used to establish origin of signal in a manner similar to well-known Loran techniques. It should be understood however that at times, but with less reliability, the surface sound channel may be utilized in lieu of the Sofar channel.

A primary object of this invention is the provision of an improved construction for neutrally buoyant deep-drifting float assemblages adapted to communicate location ascertainable intelligence in the Sofar sound channel.

A further object of the invention is the provision of an improved Swallow-type float construction incorporating a multiplicity of releasable neutrally-buoyant signalling modules which are preprogrammable so as to release, move into and detonate in the selected sound channel at predetermined time intervals in order to facilitate the tracking of said float from remote locations therefrom. More specifically, another object of the invention is the provision of apparatus and method for altering the neutral buoyancy condition of said tracking modules at predetermined time intervals and in predetermined sequence so as to effect introduction of the enclosed explosive signalling charge into the desired sound channel which may be above or below the current channel being investigated. Detonation of the signalling charges in the sound channel and preferably on the sound channel axis, will enable remote observers with suitably located listening apparatus to determine a point on a two-dimensional track of the parent float. From a succession of such points which comprise the track and arrival times thereof, parameters of ocean currents such as speed and direction along the track are readily calculated.

Another object is the provision of tracking modules of the type described above having the additional capability of simultaneously telemetering information specifying present running depth of parent float. In this embodiment a dual charge system is employed in place of the single tracking charge previously carried by each module, and the time intermediate the charge detonations is utilized to transmit encoded information specifying the increment of depth intermediate that of the parent float and the sound channel axis employed.

By the use of such method and apparatus a three-dimensional track of the parent float is readily obtainable. In a similar fashion, additional independent parameters of interest such as water temperature, salinity and the like may be obtained by allocating to each telemetering time interval intermediate successive detonations of an n-tuple charge system.

Still another object of the present invention is the provision of a novel method and apparatus capable of plotting the track and depth excursions of large fish or sea mammals. Vital scientific investigations of this type as heretofore conducted have been time-consuming, short-range and of generally marginal character utilizing a short-lived and low-power electro-sonic "tage" as described by G. D. Friedlander, "Ocean Engineering: Food Fish for a Hungry World," IEEE Spectrum, pp. 59–68, November 1966.

Other objects and advantages of the invention as well as a more detailed explanation and disclosure of the presently preferred embodiments thereof may be obtained by referring to the following specification and to the appended drawings wherein.

Figure 1A:
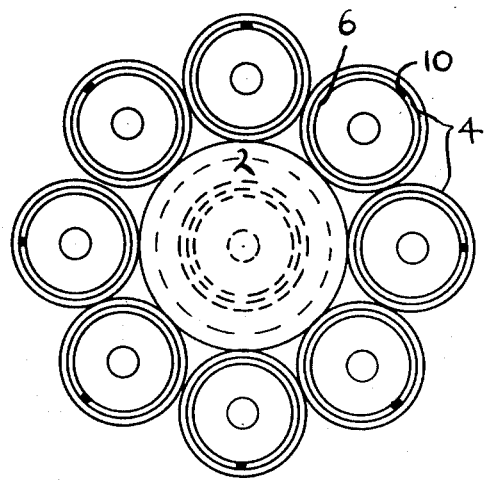
FIG. 1A is a plan view of a parent float assembly incorporating a tubular Swallow type float on whose outer peripheray is mounted a multiplicity of tubular magazines each of which is loaded with a second multiplicity of signalling modules.
Figure 1B:
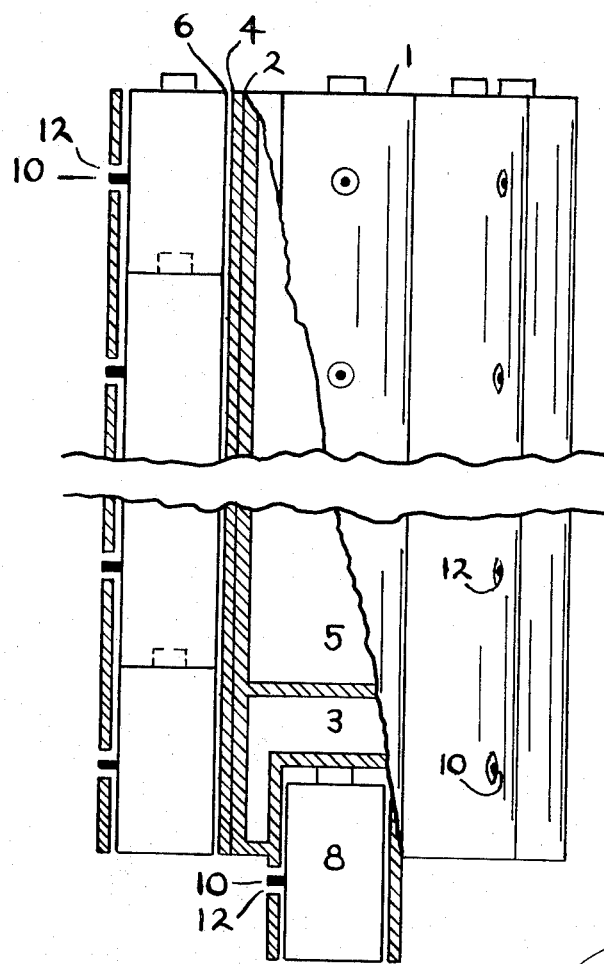
FIG. 1B is a side view, partially in section, of the parent float of FIG. 1.

Reference will now be made to the drawings wherein similar reference characters indicate like elements throughout. As shown in FIGS. 1A and 1B a parent float assembly system includes a core in the nature of a centrally disposed Swallow-type float 1, suitbaly of elongate tubular configuration and incorporating the usual neutrally buoyant floatation chamber 5 and an associated ballast chamber portion 3. Mounted in encircling relation about the periphery of the Swallow type core float 1 and with their longitudinal axes disposed parallel to that of the core float are an array of signalling module magazine tubes 4. In order to hasten the descent of such parent float assembly to a desired operating depth a "sinker" module 8, which may or may not possess a signalling capability of the type hereinafter described, is releasably mounted on the bottom of the core float 1 and is there held in position by means of an automatically retractable latching pin 10 which engages an adjacent locking hole 12 disposed in the immediately surrounding housing therefor. As illustrated the magazine tubes 4 are preferably open-ended and each contains a plurality of vertically stacked neutrally buoyant signalling modules 6 with each of said signalling modules being releasably retained within said magazine tubes 4 by automatically retractable pins 10 disposed in operative relation with locking holes 12 in the surrounding portion of the magazine tubes.

Figure 2:
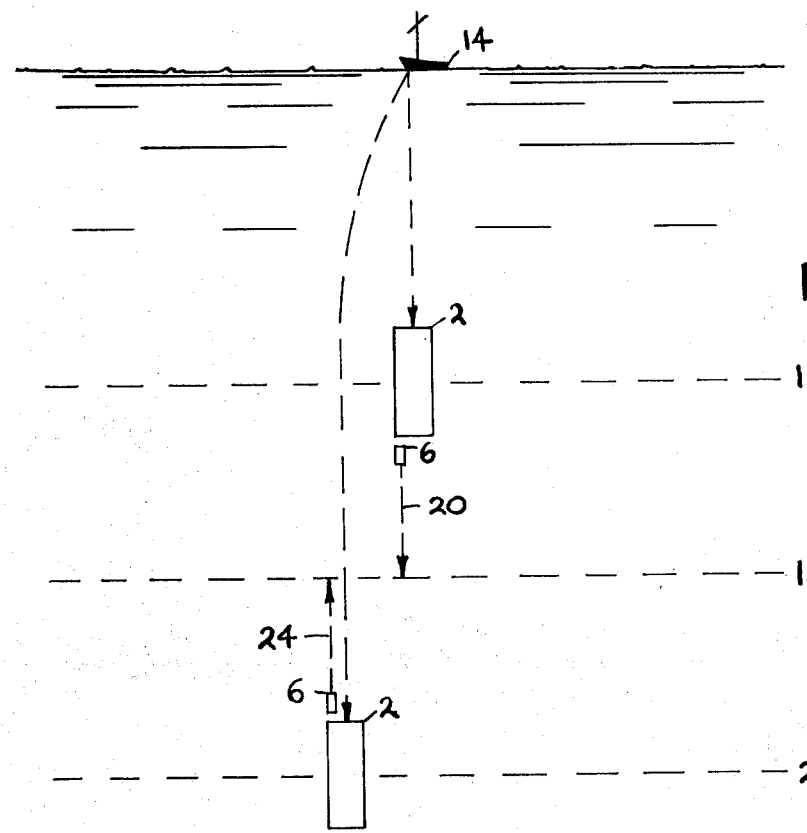
FIG. 2 is a schematic elevational view showing the positional relationship of float laying vehicle to floats disposed at possible drift levels above and below the deep sound channel axis.

Referring now to FIG. 2, such a parent float assembly 2 may be deployed in the usual manner from a surface vessel 14. In use, the negative buoyant sinker module 8 is preferably preprogrammed to effect retraction of the latch in 10 and its release from the core float 1 when float assembly 2 reaches the vicinity of the desired operating depth as indicated, by way of example, by the dotted lines 18 or 22. The parent float assembly containing a multiplicity of neutrally buoyant signalling modules 6 stacked in each of the plurality of magazine tubes 4 will then, because of the neutral buoyancy of the entire assembly, drift with the ocean current at such desired depth. At preprogrammed time intervals and in any desired sequence the signalling modules will be individually released and concurrently therewith they will alter their individual neutrally buoyant condition so that they will fall or rise into the sound channel as designated by the dotted line 16 wherein they will function to generate a high energy sonic signal which will permit remote listening stations to establish the drift position of the parent float assembly 2.

As will now be apparent, such signalling modules will be selectively constituted as to be displaceable either upwardly or downwardly from the parent float assembly depending upon the operational location of the parent float assembly 2 relative to the sound channel axis 16. While cost consideration may require standardization of design for the signalling modules 6 a suitable construction for two separate mission oriented types of signalling module 6, one modifiable to a negatively buoyancy condition and the other modifiable to a positive buoyant condition relative to their neutrally buoyant condition will be described herein in the interests of clarity.

Thus, for systems wherein the neutral buoyant condition of the parent float asembly 2 is such as to cause the same to drift in a current 18 disposed above the sound channel axis 16, the signalling modules 6 that will be incorporated therein will be designed so as to be neutrally buoyant at such current level until released. Such modules 6 are also so constructed as to render themselves negatively buoyant upon such release to thereby move down onto or near the sound channel axis 16 under the influence of gravity as diagrammed at 20. Conversely, if the neutral buoyancy of the parent float assembly is preset as to cause the same to drift below the sound channel axis 16 in a current 22, the individual signalling modules are constructed so as to be neutrally buoyant at such current level and are also of such character as to render themselves positively buoyant upon release so as to move up into the sound channel axis 16 as diagrammed at 24.

Figure 3:
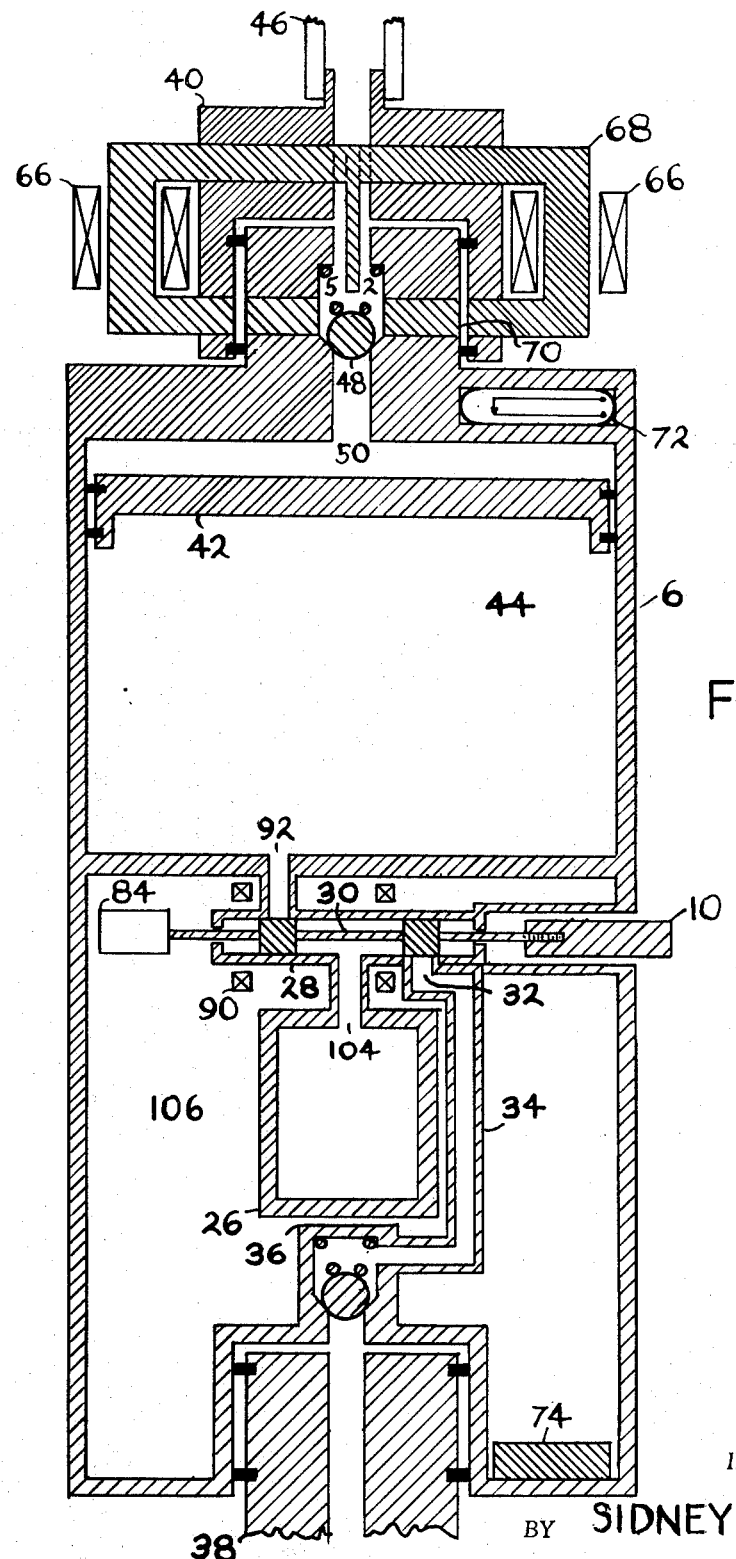
FIG. 3 is a vertical sectional view illustrating a presently preferred internal construction for the signalling modules and auxiliary support equipment fittings used to prepare said modules for operation.

FIG. 3 illustrates, by way of example, a suitable and presently perferred construction for a preprogrammable signalling module 6. As there shown, such module 6 includes a generally cylindrically shaped body, the upper portion of which generally defines a buoyancy chamber 44 having a movable piston 42 contained therein. The lower portion of the housing contains in air bottle 26 selectively connectable to a charging pipe 34 and to the portion of said buoyancy chamber 44 disposed beneath the piston 42 through a three-way slide valve asembly generally designated 28. The charging pipe 34 communicates exteriorly of the module through a check valve assembly 36 and the portion of the upper buoyancy chamber disposed above the piston 42 communicates exteriorly of the unit through a second check valve assembly generally designated 48.

In order to prepare such a signalling module for use at a particular depth, i.e. to precondition the same so as to possess neutrally buoyant characteristics at such predetemined depth, the stem 30 of the three-way valve assembly 28 is moved to its rightmost limiting position as viewable in FIG. 3. When so positioned the conduit 34 will be directly connected with the entry conduit 104 to the air bottle 26. High pressure air having a post expansion pressure greater than the water pressure that will be extant at the desired parent float drift level is then introduced through a quick disconnect air coupling 38, the check valve 36 and the conduits 34 and 104 to the air bottle 26. When the bottle 26 has been charged to the preselected pressure the slide member 30 of the three-way control valve assembly 28 is manually moved to the central or "or" position as specifically shown on FIG. 3, thus closing the conduit 34 and isolating the air bottle 26 after which the high pressure air source coupling 38 is removed.

A metered or pulsed quanta of low pressure, but at a greater pressure than atmospheric pressure, water is then injected into the poriton of the buoyancy chamber 44 above the piston 42 by means of an electromagnetically controlled water injection valve assembly generally designated 40 which may suitably be incorporated in a quick disconnect type of coupling. With such a unit the build-up of water pressure above the piston 42 will serve to downwardly displace the same and to compress the atmospheric air trapped beneath said piston member in the buoyancy chamber 44. As the piston 42 is downwardly displaced by the injected water, the effective size of the gas-filled portions of the buoyancy chamber 44 is thereby preadjusted to render the signalling module 6 neutrally buoyant in accordance with the predictated density conditions that will prevail at the desired operating depth for the parent float assembly.

Figure 4:
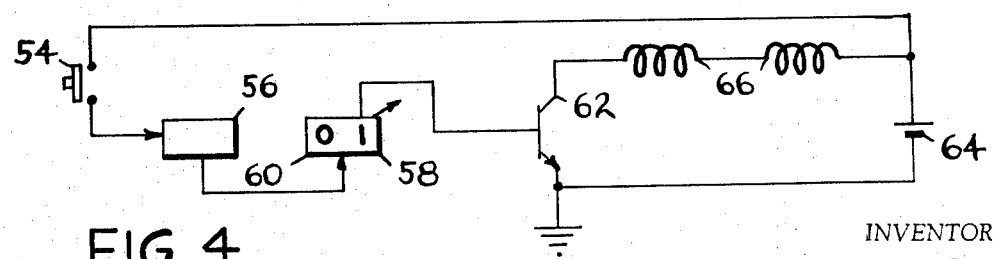
FIG. 4 is a schematic block diagram of auxiliary control equipment to assist in the operational preparation of said signalling modules.

More specifically, such metered quantities of water are injected into the upper end of the buoyancy member 44 through the entry orifice 50 thereto from an external supply hose 46 through the above-noted injector valve assembly 40. However, such water is normally prevented from entering the upper portion of the buoyancy chamber 44 by the interposed steel ball closure member of the check valve assembly 48 which is normally biased into sealing engagement with the end of the entry conduit 50 by a nonmagnetic spring member 52. With such a described construction displacement of the valve closure member from sealing engagement with the conduit 50 will permit the entry of water into the portion of the buoyancy chamber 44 disposed above the piston 42. Referring now to FIG. 4, suitable means for effecting a controlled displacement of the closure member in such check valve assembly 48 is illustrated. As there shown, closure of the water injection control button 54 will cause the trigger generator 56 to emit a pulse to trigger the adjacent monostable flip-flop or multi-vibrator 58 which is adapted to emit a positive voltage electrical pulse for a predetermined time period settable by control 60. For the duration of said pre-set time period the positive pulse emitted from a multi-vibrator 58 will, in effect, turn on or energize the power transistor 62 to thereby effect the gating of a pulse of current from the battery 64 through the series connected electro-magnetic coil windings 66 of the aforesaid water injector valve assembly 40.

Such energization of the electro-magnetic coil windings 66 generates a magnetic flux in the contained magnetic circuit consisting of the iron yoke 68, the two iron rod inserts 70 and the ball of the check valve 48 with concommitant displacement of the latter against action of the biasing spring 52 upwardly and out of sealing engagement with the entry conduit 50 to permit a short spurt or jet of water under pressure to enter the upper portion of the buoyancy chamber 44 and with the duration of said water jet being determined by the setting of the multi-vibrator 58. As the over-all quantity of water introduced into the upper portion of the buoyancy chamber 44 increases through operation of a repetitive sequence as described above, the piston 42 will be progressively displaced and such will effect a concommitant decrease in the buoyancy capability of the buoyancy chamber 44. With the completion of each current pulse period the magnetic flux will markedly decrease and the ball of the check valve 48, under influence of its biasing spring 53 will reclose the entry aperture 50. As will be apparent, the above cycle may be repeated under manual or automatic control until the piston 42 in the buoyancy chamber 44 is adjusted so as to render the module 6 neutrally buoyant at the desired operating depth of the parent float assembly.

For operation of the parent float assembly 2 below the sound channel axis 16, as illustrated by its disposition at depth 22 in FIG. 2, a plurality of signalling modules suitably conditioned to the desired neutral buoyancy condition are stacked one above another in upright position within the magazine tubes 4 disposed in encircling relation with the Swallow-type core float 2. As illustrated, the signalling modules are disposed within the module magazines 4 in such manner as to coaxially align the locking holes 12 of the magazine tubes 4 with the stems 30 of the three way control valve assemblies 28 thereof. When so positioned the terminal module-magazine latching pins 10 are then threaded into the ends of the valve stems 30 from the outside of the magazine tubes to thereby effectively latch the modules in vertically stacked array within each of the magazine tubes.

In operation of the subject units, the parent float assembly 2 as so constituted will normally be drifting with a sub-surface ocean current 22 which will now be assumed to be below the sound channel axis 16. As shown in FIG. 3, each signalling module will also contain a magnetic reed switch 72 whose contacts will be normally closed in the absence of the presence of a bar magnet keeper 74 in proximity thereto, as, for example, a bar magnet keeper of the type located in the bottom of each said signalling module 6. In such arrangement, the uppermost module 6 will start this preprogrammed release timing cycle as soon as the contacts of its magnetic reed switch are closed. For example, removal of an external keeper element 34 from proximity therewith.

Figure 5:
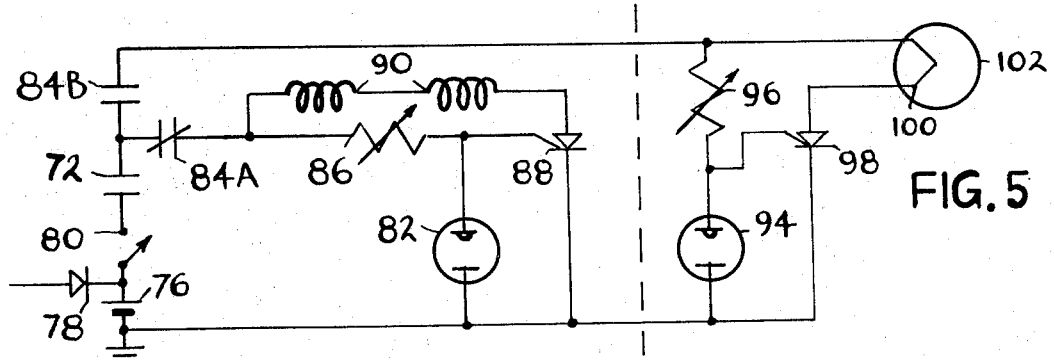
FIG. 5 is a schematic block diagram of a suitable timer-detonator circuit mechanism includable in said modules to permit the remote tracking of inanimate objects.

A suitable means for effecting the preprogrammable timed release of the signalling modules 6 is illustrated in FIG. 5. As there shown, the module contained storage battery 76 is disposed in series with the reed switch contacts 72 and an arming switch 80. The storage battery 76 is adapted to be precharged through an auxiliary diode 78 immediately prior to a mission. After charging of the battery, the arming switch 80 is closed which effectively completes the time delay circuit constituted by the normally closed reed switch contacts 72, the normally closed contacts 84A of a microswitch 84 operatively associated with the three-way control valve assembly 28 and actuatably responsive to the lineal displacement of slide member 30 thereof, a presettable time delay rheostat 86 and a first electrochemical time delay cell 82, as for example of the type manufactured and sold by the Bissett-Berman Corporation of Los Angeles, Calif. Such suitable electrochemical time delay cells operate with electrical power expenditure in the nanowatt range and lengthy time delays are quite feasible. At the expiration of the presettable cell 82 time delay the voltage across such cell will rise sharply and effect a current flow through the silicon controlled rectifier 88 which in turn will energize the solenoid windings 90 for the three-way control valve 28. Energization of such solenoid windings will effect a lineal displacement of the stem 30 to the left, as shown in FIG. 3, and to lock or latch in such retracted position. The stem 28 displacement will effect a concurrent opening of the normally closed switch contacts 84A, opening the circuit for the solenoid windings and thereby effecting a de-energization of the same. The stem displacement will effect a concurrent closure of the normally open switch contacts 84B to thereby initiate a second time delay cycle. As will be apparent, the displacement of the stem 28 to the left as illustrated in FIG. 3, will effect the withdrawal of the latching pin 10 terminally mounted thereon from its associated latching hole 12 to thereby effect a release of the signalling module 6 from the float magazine tube 4. Concurrently with the release of the signalling module 6 the displacement of the valve operating stem to the left effectively places the conduit 92 in fluid communication with conduit 104 thereby creating a pneumatic circuit from the air bottle 26 to the lower portion of the buoyant chamber 44 and to permit a flow of air from the air bottle into the buoyancy chamber to modify the buoyancy condition of the module by changing the same from a neutrally buoyant condition to a condition of positive buoyancy. The above action will thereby cause the released module 6 to commence an ascent from its point of release. Since the vertical distance intermediate the desired parent float drift depth and the depth of the sound channel 16 and the rate of ascent of a given signalling module will be ordinarily known with sufficient accuracy before the start of the mission, the desired time interval intermediate release of the module and its subsequent detonation is readily precalculatable and the second time delay is preset in accord therewith.

Returning now to the FIG. 5 circuit, the closure of the microswitch contacts 84B will serve to complete the energization circuit for a second electrochemical time delay cell 94 which is connected in series with a presettable time delay rheostat to fix the duration of the desired second time delay period. In a manner similar to that explained above the expiration of the second time delay period results in a markedly increased current flow through the second silicon controlled rectifier 98 and in electrical detonation of an explosive squib 100. The squib 100 will, in turn, effect detonation of an explosive charge 102 thereby generating a high energy sonic signal at or near the sound channel 16 which may be received by remote listening stations attuned thereto. The departure of the uppermost signalling module 6 in a given magazine tube 4 effects a removal of its permanent keeper magnet 74 from overlying proximity with the reed switch 72 with the next lower module in the stack. Therefore, such departure automatically effects closure of the contacts of the reed switch 72 in the next lower module in the stack and, since the arming switch 80 for such next module is in an already closed position, the aforedescribed timing cycles will be automatically repeated for each module 6 disposed in vertical stacked array in a given magazine tube 4. Such progressive release and separation of the individual signalling modules will continue in sequence until all of the modules 6 in a given magazine 4 have been displaced and supply thereof exhausted. At this time, the uppermost signalling module 6 of a second magazine tube 4 will be awaiting the expiration of its first preset timing delay in order to initiate the progressive and sequential release of the respective signal modules of the second magazine tube 4 at their respective preprogrammed release times.

For example, assume that signalling modules 6 are to release themselves in a uniform time sequence with time interval intermediate releases symbolized by the character "T." Further, let there be "N" modules per magazine and "M" magazines per float; then the first time delay for the uppermost module 6 of the $m$th magazine 4 would be preprogrammed in accordance with the following formula:

$$T_m = [(m-1)N+1]$$

where $1 \leq n < N$ and $1 \leq m < M$.

In contradistinction to the above, for operation of the parent float assembly 2 at a drift level disposed above the sound channel axis 16, i.e. as on the drift level 18, the neutrally buoyant signalling modules will be stacked in the magazine tubes 4 in an upside-down position with the lowermost signalling module in each such magazine being programmed to be first released therefrom. Since displacement of the signalling module from the drift channel to the sound channel is now downward in nature, the buoyant condition of the signalling modules must be changed from neutral buoyancy to a negative buoyancy at the time of release. Such type of buoyancy change affords a possible simplification of the basic construction for the signalling module 6 from that previously described. For example, the contained air bottle 26, the conduit 34 and the check valve assembly 36 will no longer be needed for operative purposes and, therefore, may, if desired, be omitted from the structure. Such omission, in effect, permits the direct connection of the buoyancy chamber 44 to port 104 through the three-way control valve 28. When so arranged, the leftward displacement of the valve stem 30 effects a release of the signalling module from the parent float assembly 32 and directly connects the buoyancy chamber 44 to the outside water world through the vented lower portion of the moduled housing. As so constituted, air that was trapped in the buoyancy chamber 44 beneath the piston 42 thereon during the preconditioning processes wherein the module 6 was rendered neutrally buoyant is automatically vented exteriorly of the module and such venting causes the module to become negatively buoyant and to descend toward the sound channel 16. As previously described, the second time delay circuit is presettable to allow a sufficient passage of time to permit the released module to reach the sound channel at which time the detonation of the charge 102 provides a high energy sonic signal on or near the sound channel axis 16 for remote reception and timing thereof by distant observers.

As mentioned earlier, the sinker module 8 is desirably employed to hasten the descent of the parent float assembly 2 to the desired drift level subsequent to launching thereof. Such sinker module may be utilized with or without a signalling capability. In its simplest sense such sinker module is so constructed as to be negatively buoyant both before and after release and as such a still further simplification of the basic module construction may be made and the resulting unit will still be constituted to fulfil the desired sinker and release functions. Specifically, if the signalling function is not required, all circuitry and components associated with the same may be omitted and during the float preparation and assembly stage the buoyancy chamber 44 of the sinker module may be completely flooded in order to render it negatively buoyant. When so constituted only the release portions of the control circuit of FIG. 5 as located to the left of the dashed line thereon will be required.

As will be apparent from the foregoing, the design of the basic module 6 has been presented in the most complete form thereof wherein the module is adapted to be conditioned to neutral buoyancy prior to release from a parent float assembly 2 and be automatically rendered positively buoyant thereafter. With such basic construction a simplified modification permits said modification to be rendered negatively buoyant subsequent to release as contrasted with the positive buoyancy discussed above. By a still further simplified modification, said modules may be rendered negatively buoyant before and after release and to thus serve as a suitable sinker module 8. Such functional capability attendant the basic structure permits a ready standardization of design and the stocking of one type of unit which may be readily modified as outlined above to provide units of varying functional capability in accordance with the exigencies of a particular operational situation.

As will also be apparent the basic units may also be employed for signalling and tracking purposes in instances wherein an initial presetting of a neutrally buoyant condition is not required as for use in conjunction with unmanned submersibles, or the like, which need not operate under neutrally buoyant constraints. In such instance, the signalling modules 6 need only be preset to effect release thereof at the desired time intervals and to be thereafter rendered either positively or negatively buoyant depending upon whether they are to arise or fall into the sound channel 16. Where the location of the submersible is known relative to the sound channel such selective buoyancy characteristics can also be preset prior to the initiation of a mission.

In addition to the basic construction as heretofore described, each signalling module 6 may be equipped with a plurality of explosive charges 102, each with its own control circuit that may be preprogrammed so as to effect a sequenced detonation of said plurality of charges with predetermined time intervals intermediate the detonations thereof to thus provide a communication capability in addition to the basic tracking capability described above.

Neutrally or near neutrally buoyant signal modules may also be used to advantage in the long-range, long-time tracking of underwater moving objects 110 such as submersibles and even aquatic animal life. One of the many problems attendant such long-range long-time tracking operations of this general nature is the vast and wide ranges that may be traversed by the target object 110 during the tracking period. Under such circumstances it may be necessary for the signalling modules 6 to inherently accommodate or compensate for variations in the sound channel 16 depth mainly due to differences in the temperature structure of the oceans at different latitudes.

In the interests of simplicity, the depth of the sound channel 16 can be considered to be simply a function of latitude over most of the world's oceans with the sound velocity minima being generally found in the 700–1300 meter depth interval except in those regions where the water tends to be isothermal, as, for example, in the Weddel Sea in the Antarctic (see Fig. 28 on page 69 of "General Oceanography" by Gunter Dietrich, Interscience Publishers, New York, 1963). In such regions, the sound channel axis 16 tends to be located near the surface. If it be known for certain that the target object in question will spend all of the observational period in any one particular region then, of course, it will not be necessary for the tracking systems to accommodate such latitudinal effects into consideration. In general, however, signalling systems should be flexible enough to accommodate said effect.

Figure 7:
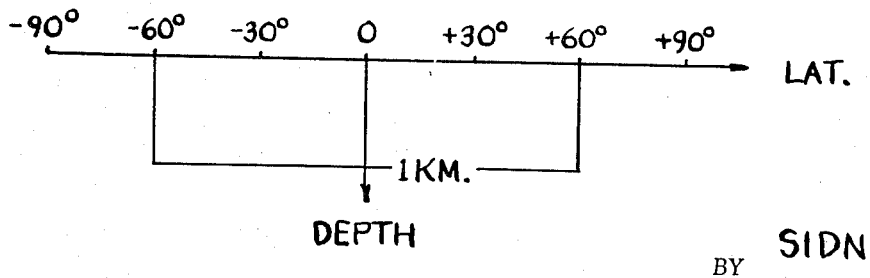
FIG. 7 is an idealized graphically presented distribution of the deep sound channel depth over the world ocean as a function of latitude.

For illustrative purposes it may be assumed with a reasonable degree of accuracy that the actual complex distribution of the permanent sound channel axis 16 location over the world's oceans may be simulated by the approximate two-layer distribution pattern shown on FIG. 7. For this idealized distribution pattern which has been obtained from data presented in Fig. 28 of the above noted Dietrich "General Oceanography" text, it is only necessary for the modified signalling modules 6 to be capable of distinguishing between the polar regions and the remainder of the ocean areas. If it be assumed that the object being tracked spent most of its time relatively near the surface, the surface temperature of the water can be used as a control parameter. Reference to available surface temperature charts shows that two degrees centigrade is the approximate line of demarcation between polar and non-polar regions of the earth's oceans. Thus, the inclusion of a temperature sensor which would be set to switch or change conditions at 2° C. may then serve to geographically partition off the polar regions for sensed temperatures of less than 2° C. with such areas being automatically associated with a surface sound channel and, with all sensed temperatures greater than 2° C. being then automatically associated with a sound channel 16 at a depth of 1000 metres. Other and more elaborate methods of accomplishing the same ends through techniques well-known to practitioners of the navigational arts may also be used in lieu of the above.

Figure 6:
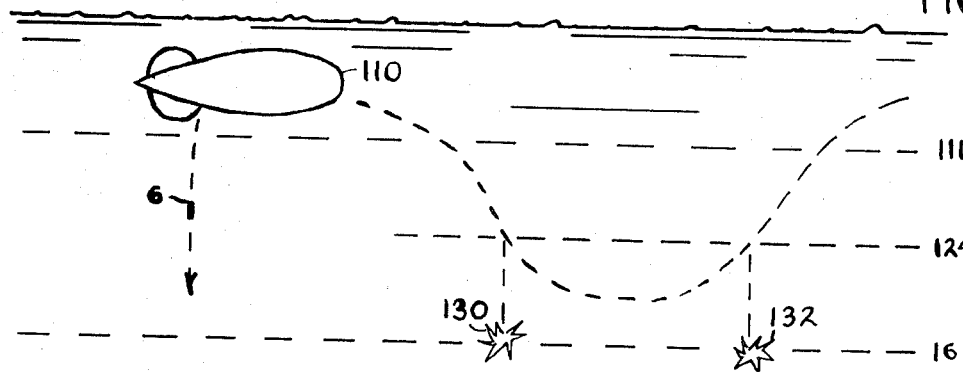
FIG. 6 is a schematic elevational view of a target object suitably outfitted for a tracking and/or specific event detection expermient and its positional relationship vis-a-vis a predetermined depth level and the deep sound channel.
Figure 8:
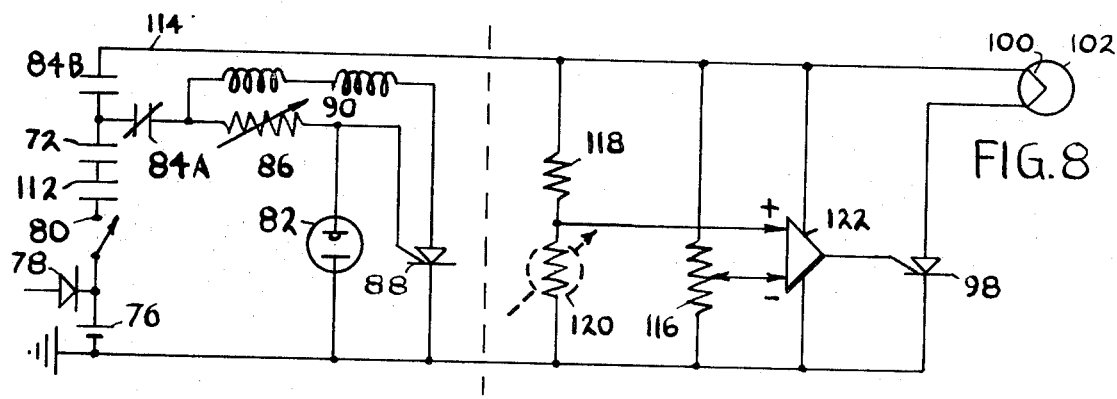
FIG. 8 is a schematic block diagram of another timer-detonator mechanism includable in said modules to permit the remote tracking of animate objects.

If it be assumed that in operation of a temperature responsive system as described above, a track is to start in a non-polar zone at some point located between +60° (North latitude) and −60° (South latitude); a reasonably accurate estimate may be made of the time interval between the start of the tracking operation and the crossing of the plus or minus 60° boundaries and that the same number of track points will be desired at both sides of said boundary, half the signalling modules 6 would then be of the neutrally-buoyant/negatively-buoyant variety and the other half of the neutrally-buoyant/positively-buoyant type with the former set to be released first. In such an assemblage the timing for the release of the individual signalling modules 6 of each group will be set in accordance with the timing equations set forth in early portions of the specification. In this situation, in contradistinction with the previously described methods of fixing detonation depths and wherein both the depth of the parent float assembly 2 and sound channel axis 16 were known before the start of a mission, the depth of the target object 110 at the time of signalling module release will not be known. In conjunction therewith it can be further assumed, however, that it will be extremely improbable that the target object will be disposed below the sound channel axis 16 in latitudes less than ±60° and such assumption circuitry can be directly reflected in the preprogramming circuitry to be hereinafter described. Referring now to FIG. 8, there is provided a signalling module 6 release mechanism of the same general character as that described above except that in this embodiment a thermostatically controlled switch member 112 is included in the power circuit in addition to or in lieu of the reed switch 72. As the first phase of the target object tracking operation has been assumed to commence in a non-polar zone, such a thermostatically controlled switch 112 will be in a normally closed condition and the signalling module 6 deployment will be as generally depicted on the left-hand portion of FIG. 6. More specifically, the closure of the microswitch contacts 84B, following release of the individual signalling module from a magazine tube or like container, will energize the line 114 which in turn creates a potential drop across the sound channel set point potentiometer 116 and across a fixed resistor 118 and a solid state piezoresistive water pressure sensor member 120 connected in series therewith. A representative curve of $\Delta R/R$ vs. strain for a suitable type of piezoresistive water pressure sensor member 120 is shown on page 194 of "Physical Acoustics," Volume I, Part B, edited by Warren P. Mason, Academic Press, New York 1964. The above-described resistive elements in conjunction with an operational amplifier 122 generally constitute a Wheatstone bridge type circuit whose output will be sensed by the differential inputs of the operational amplifier.

Initially the sound channel set point of the potentiometer 116 will apply a more positive voltage to the inverting or negative input terminal of the difference amplifier 122 than the particular voltage that is applied to the non-inverting or positive input thereof. With such an arrangement and by continually substracting voltages proportional to the sound channel axis 16 depth and the actual depth of each released signalling module 6 until correspondence therebetween is noted the differential amplifier 122 will perform the dual function of both computer and trigger element. Thus, while initially the output of the amplifier 122 will be at such a low potential as to be insufficient to cause a silicon controlled rectifier 98 to be in a conducting condition, the continued descent of the signalling module after release will result in an increase in resistance of the pressure sensitive piezo-resistive sensor 120. When such signalling module reaches the sound channel axis 16 the voltage upon the non-inverting input to the operational amplifier 122 will become of such magnitude as to be slightly more positive than that present on the preset sound channel set-point voltage on the inverting input thereof. At such time, the output voltage of the high-gain differential amplifier 122 will immediately rise to its saturation potential firing the silicon-controlled rectifier 98 with concommitant detonation of the explosive squib 100 and subsequent detonation of the charge 102 to provide a high energy signal in the sound channel 16. As the proposed track crosses a 60° parallel and enters into a polar zone with its concommitant decrease in water temperature to below 2° C. a complementary version of the thermostatically controlled switch 112 will automatically close in each module in the set of preset neutrally-buoyant/positively-buoyant signalling modules 6. In this set of signalling modules 6 the sound channel set-point of potentiometer 116 will be preset near the bottom limit thereof so as to accommodate for the expected near surface sound channel conditions and the connections to the operational differential amplifier 122 will be reversed. Thus, in the polar regions the target object 110 will normally cruise well below the sound channel access and upon release the individual signalling modules will rise and the explosive charges 102 will be detonated in the vicinity of the water surface.

Other types of sensing devices may be incorporated in the basic control circuit as illustrated in FIG. 8 to provide additional functional versatility and to accommodate other specific operating parameters of concern. By way of example in particular situations wherein the density of water at the desired drift level for a parent float assembly 2 varies appreciably with location or where such a float would be subject to internal waves of large magnitude such that prelaunch calculations are unable to reasonably guarantee that detonation signalling will indeed occur in sufficient close proximity to the sound channel axis 16 to reliably provide for an intelligibly remote read-out, the preprogrammed circuitry to the right of the vertically dashed line on FIG. 5 may be replaced with more sophisticated circuitry of the type shown in FIG. 8, as described above.

The utilization of such depth-sensing devices may be incorporated in the signalling modules 6 for utilization thereof as specific event detectors to indicate, for example, the time of an occurrence as well as other pertinent information concerning the same. Such an event could be, for example, the extent of movements of target objects in a vertical plane. Referring again to FIG. 6, it may be presumed that a target object 110 will spend most of its time relatively near the surface and above an arbitrarily defined depth line 111. In such a case a deep dive or a dive beyond the predetermined depth would be an example of a specific and perhaps rare event. For such a dive at least the depth and duration thereof would be specific events of interest. To provide such information a pair of signal modules operated in tandem are preferred. One of such signalling modules would be specifically preprogrammed to effect the release thereof from its magazine tube or other container when a predetermined control depth as indicated by the line 124 was first exceeded as, for example, on the descent path. Similarly, the other signalling module of such pair would be preset to effect a release thereof when such control depth 124 was crossed on the subsequent ascending portion of the track.

Figure 9:
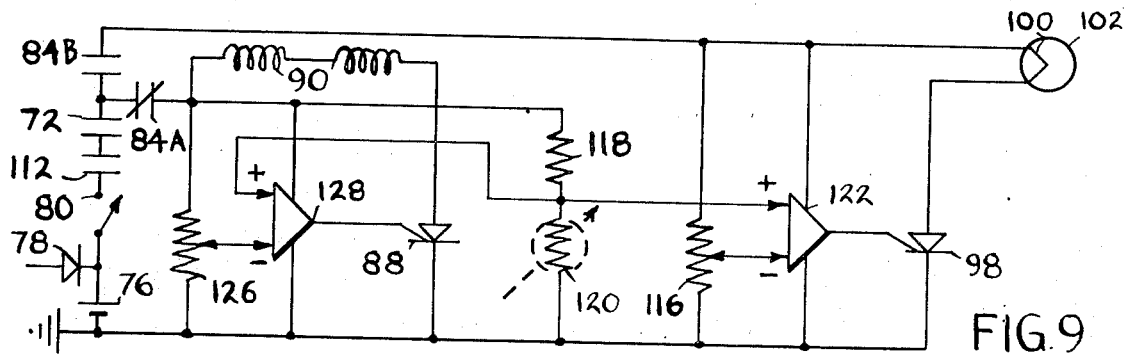
FIG. 9 is a schematic block diagram of another timer-detonator mechanism includable in said modules to permit the remote determination of the cross of a predetermined depth level and the time interval thereof.

As shown in FIG. 9 such accommodation may be readily effected by presetting the module release set point potentiometer 126 so that when a second operational amplifier 128 senses that the water pressure on the pressure-sensitive transducer 120 exceeds the pressure extant at the desired control depth 124, the silicon controlled rectifier 88 associated therewith is fired thereby releasing such first signal module 6 from its housing in the manner previously described. As before, release of said module will be accompanied by the closing of microswitch contact 84B which will function to both energize the preset sound channel depth set-point potentiometer 116 and associated operational amplifier 122. As such signalling module 6 freefalls toward the sound channel axis 16, the pressure on the transducer 120 will continually increase and, when the sound channel 16 is reached, the amplifier 122 will effect firing of the silcon control rectifier 98 associated therewith to detonate a squib and charge 102 to create a high energy signal in the form of an explosion 130 on or near the sound channel axis 16.

The second signalling module of such a pair will be preset in the same manner except that in this instance the input leads to the operational amplifier 128 will be reversed since the point of concern is now the displacement of the target across the control depth 124 in an ascending manner. When such event occurs the second signalling module 6 will be released from its container again resulting through the above-described sequence of events in a high energy signal in the form of an explosion 132 in the sound channel 16. Thus, through utilization of the above-described method and apparatus the said pair of signalling explosions 130 and 132 at completely unprogrammed and random times effectively signifies that a dive by target object 110 below the control depth 124 has in fact taken place and the time interval intermediate said signal explosions defines the duration thereof.

The foregoing example of a specific event detector is suitable for operation in latitudes less than ±60° as implied by the employment of the neutrally-buoyant/negatively-buoyant version of the basic signalling module 6. For measurements of this type in the polar regions, similar preprogramming techniques would be used in conjunction with the neutrally-buoyant/positively-buoyant version of the basic signalling module 6. However, said positively buoyant version would also be used in non-polar regions if specific events were to occur below the sound channel axis.

It should now be apparent that the preprogrammability of the subject signalling module constructions allow them to be used for many sophisticated and varied underwater data acquisition missions. Their inherent interdisciplinary nature, i.e., electronic, mechanical, hydraulic, pneumatic, etc., admits of programming techniques limited only by ingenuity. For example, in lieu of the piezoresistive pressure sensor/operational amplifier combination heretofore described to initiate action, other techniques well known to practitioners of the art such as a capactive pressure sensor controlled electronic oscillator/frequency selective resonant reed relay combination could be used to advantage.

Having thus described our invention, we claim:

1. Apparatus for effecting direct measurement of subsurface oceanographic phenomena comprising,
   a core float member selectively renderable neutrally buoyant in accordance with a desired drift level beneath the ocean surface,
   a plurality of signalling modules each selectively renderable neutrally buoyant in accordance with said desired drift level releasably secured to said core float member, means responsive to predetermined time delays following specific occurrences for effecting the selective and sequential release of said neutrally buoyant signalling modules from said core float member, means responsive to the release of said signalling modules from said core float member for altering the neutrally buoyant condition thereof to induce a selectively directed displacement of the released modules toward a predetermined oceanic sound channel, and means for effecting emission of a high energy sonic signal from said modules when the latter are disposed in proximity to said sound channel.

2. Apparatus as set forth in claim 1 wherein said last mentioned means comprises means responsive to a second predetermined time delay following the release of said modules from said core float member for initiating signal emission therefrom.

3. Apparatus as set forth in claim 1 wherein said last mentioned means comprises means responsive to coincidence between the ambient pressure upon said released modules and a predetermined value thereof for initiating signal emission therefrom.

4. Apparatus as set forth in claim 1 wherein said high energy sonic signal comprises an explosive detonation.

5. Apparatus as set forth in claim 1 wherein said specific occurrences that initiate said first predetermined time delays comprise the release of a preceding signalling module.

6. Apparatus as set forth in claim 1 wherein pluralities of said signalling modules are disposed in vertical stacked array in magazine tubes mounted on said float member.

7. Apparatus as set forth in claim 1 wherein said signalling modules comprise housing means defining a buoyancy chamber adapted to contain predetermined quantities of a liquid and a gas under pressure and separated by a movable piston member in accordance with the desired drift level thereof, latching means for relasably securing said modules to said core float member and means responsive to the unlatching of said latching means for modifying the conditions extant within said buoyancy chamber to alter the predetermined buoyancy condition thereof.

8. Apparatus as set forth in claim 7 wherein said last-mentioned means includes a valve means connected to the gas containing portion of said buoyancy chamber and operable in conjunction with said latching means.

9. Apparatus as set forth in claim 8 wherein operation of said valve means vents said gas containing portion of said chamber to increase the negative buoyancy of said modules.

10. Apparatus as set forth in claim 8 including an auxiliary supply of high pressure gas introduceable into said gas containing portion of said chamber by operation of said valve means to increase the positive buoyancy of said modules.

11. Apparatus for tracking of target objects comprising magazine means securable to a neutrally buoyant target object adapted to move at predetermined depths beneath the ocean surface, at least one signalling module releasably securable within said magazine, means responsive to a predetermined pressure and the rate of change of pressure in proximity therewith for effecting the release of said signalling module from said magazine means and means responsive to coincidence between the ambient pressure upon said released module and a predetermined value thereof for emitting a high energy sonic signal therefrom.

12. Apparatus for tracking of underwater target objects comprising magazine means securable to a target object adapted to move beneath the water surface, at least one positively buoyant signalling module relative to a neutrally buoyant condition representative of a predetermined depth level releasably securable within said magazine means, at least one negatively buoyant signalling module relative to said neutrally buoyant condition representative of said predetermined depth level releasably securable within said magazine means, means responsive to the temperatures of the ambient water for selectively effecting the release of said positively buoyant signalling module from said magazine means when the ambient water temperature is below a predetermined value and for selectively effecting the release of said negatively buoyant signalling module from said magazine means when the ambient water temperature is above said predetermined value, and means responsive to coincidence between the ambient pressure upon said released module and a predetermined value thereof for emitting a high energy sonic signal therefrom.

References Cited
UNITED STATES PATENTS 2,760,180   8/1956   Sipkin _____ 340—2X RODNEY D. BENNETT, Primary Examiner D. C. KAUFMAN, Assistant Examiner U.S. Cl. X.R.

340—5; 116—23, 137